(12) United States Patent
LeRoux et al.

(10) Patent No.: US 8,612,947 B2
(45) Date of Patent: Dec. 17, 2013

(54) SYSTEM AND METHOD FOR REMOTELY COMPILING MULTI-PLATFORM NATIVE APPLICATIONS FOR MOBILE DEVICES

(75) Inventors: Brian LeRoux, Port Coquitlam (CA); James Douma, West Vancouver (CA); Andre Charland, North Vancouver (CA); Dave Johnson, Vancouver (CA); Brock Whitten, Vancouver (CA); Robert Ellis, Vancouver (CA); Joey Bowser, Vancouver (CA)

(73) Assignee: Adobe Systems Canada Inc. (CA)

( * ) Notice: Subject to any disclaimer, the term of this patent is extended or adjusted under 35 U.S.C. 154(b) by 176 days.

(21) Appl. No.: 12/843,770

(22) Filed: Jul. 26, 2010

(65) Prior Publication Data

US 2011/0154305 A1    Jun. 23, 2011

Related U.S. Application Data

(60) Provisional application No. 61/230,663, filed on Jul. 31, 2009.

(51) Int. Cl.
*G06F 9/45* (2006.01)

(52) U.S. Cl.
USPC ............ 717/140; 717/137; 717/146; 717/147

(58) Field of Classification Search
None
See application file for complete search history.

(56) References Cited

U.S. PATENT DOCUMENTS

| | | | |
|---|---|---|---|
| 5,881,289 A * | 3/1999 | Duggan et al. | 717/145 |
| 5,946,489 A * | 8/1999 | Yellin et al. | 717/147 |
| 6,029,000 A * | 2/2000 | Woolsey et al. | 717/147 |
| 6,421,717 B1 * | 7/2002 | Kloba et al. | 709/219 |
| 6,453,465 B1 * | 9/2002 | Klein | 717/141 |
| 6,496,979 B1 * | 12/2002 | Chen et al. | 717/178 |
| 6,845,394 B2 * | 1/2005 | Ritche | 709/221 |
| 7,065,752 B2 * | 6/2006 | Willard | 717/140 |
| 7,200,809 B1 * | 4/2007 | Paul et al. | 715/205 |
| 7,210,121 B2 * | 4/2007 | Xia et al. | 717/106 |
| 7,340,724 B2 * | 3/2008 | Wolff et al. | 717/117 |

(Continued)

FOREIGN PATENT DOCUMENTS

WO    WO 2004088508    10/2004

OTHER PUBLICATIONS

Mulley, Gaius, and Keith Verheyden. "Construction and architecture of a dedicated compile server." (2005).*

(Continued)

*Primary Examiner* — Don Wong
*Assistant Examiner* — Adam Conkey
(74) *Attorney, Agent, or Firm* — Kilpatrick Townsend & Stockton LLP

(57) ABSTRACT

A computer readable medium comprises executable instructions to: provide an SDK to a client computer comprising executable instructions for communicating with a build server, receive an HTML/Javascript source application and a configuration file referencing one or more source application files over a computer network from a client computer to the build server, transmit the HTML/Javascript source application and configuration file to multiple compile servers corresponding to each of multiple mobile device platforms, combine the HTML/Javascript source application with a mobile device platform specific framework source code for each mobile device platform on each compile server, compile the HTML/Javascript source application and framework source code on the compile server to output an executable native application for each mobile device platform, and transmit each executable native application from the compile server to the client computer over a computer network.

21 Claims, 6 Drawing Sheets

(56) References Cited

U.S. PATENT DOCUMENTS

| | | | |
|---|---|---|---|
| 7,340,730 B2* | 3/2008 | Arkwright et al. | 717/148 |
| 7,610,577 B1* | 10/2009 | Roth | 717/106 |
| 7,971,194 B1* | 6/2011 | Gilboa | 717/136 |
| 8,250,137 B1* | 8/2012 | Nielsen et al. | 709/203 |
| 2001/0047394 A1* | 11/2001 | Kloba et al. | 709/217 |
| 2004/0143823 A1* | 7/2004 | Wei | 717/140 |
| 2005/0136939 A1* | 6/2005 | Mountain et al. | 455/453 |
| 2005/0155027 A1* | 7/2005 | Wei | 717/162 |
| 2006/0026573 A1* | 2/2006 | Smith et al. | 717/140 |
| 2006/0031821 A1* | 2/2006 | Rutter, II | 717/140 |
| 2006/0136881 A1* | 6/2006 | Nesbitt et al. | 717/140 |
| 2007/0011494 A1* | 1/2007 | Xie et al. | 714/38 |
| 2008/0046557 A1* | 2/2008 | Cheng | 709/224 |
| 2008/0127169 A1* | 5/2008 | Malasky et al. | 717/174 |
| 2009/0070750 A9* | 3/2009 | Gu | 717/140 |
| 2009/0113402 A1* | 4/2009 | Chen et al. | 717/140 |
| 2009/0210702 A1* | 8/2009 | Welingkar et al. | 713/156 |
| 2009/0271771 A1* | 10/2009 | Fallows | 717/137 |
| 2010/0115501 A1* | 5/2010 | Partridge et al. | 717/148 |
| 2010/0169072 A1* | 7/2010 | Zaki et al. | 703/28 |
| 2010/0211638 A1* | 8/2010 | Rougier | 709/205 |
| 2011/0022612 A1* | 1/2011 | Khader et al. | 707/756 |
| 2011/0023016 A1* | 1/2011 | Khader et al. | 717/120 |
| 2012/0151444 A1* | 6/2012 | Weissman | 717/122 |

OTHER PUBLICATIONS

"Nov. 24, 2008. Cupertino CA—Rhombile Releases The Rhodes Mobile Application Fra", Rhombile, Inc., 2009, 2 pages.

"Rhomnbile Announces RhoHub, World's First Development-as-a-Service Offering for the Mobile Industry", Rhombile, Inc., 2009, 2 pages.

\* cited by examiner

SYSTEM AND METHOD FOR REMOTELY COMPILING MULTI-PLATFORM NATIVE APPLICATIONS FOR MOBILE DEVICES

1. RELATED APPLICATIONS

The present non-provisional patent application claims priority to previously filed U.S. Provisional Patent Application No. 61/230,663 filed Jul. 31, 2009, the contents of which are herein incorporated by reference in their entirety as if they had formed part of the following description as originally filed in the present application.

2. TECHNICAL FIELD

The present invention relates generally to building software applications for mobile devices. More specifically, the present invention relates to a system and method for remote compilation of software applications suitable for native execution on multiple mobile device platforms.

3. BACKGROUND OF THE INVENTION

The use of mobile devices, and in particular handheld mobile devices incorporating computing functions with cellular telephone and data communications (commonly referred to as smartphones) has grown rapidly in popularity in recent years. This rapid growth has been in part due to the ability of users to install software applications on such mobile devices to customize the operation of the mobile device, or to offer additional features or functionality desired by users. In response, there has been a growing interest to develop new software applications for mobile devices to provide for consumer demand.

However, the market for mobile devices is generally fragmented, with multiple types of devices built around different and incompatible mobile device platforms and offered by multiple manufacturers implementing multiple different operating systems and other key aspects differentiating one mobile device platform from another. As a result, the process of developing software applications designed to run natively on mobile devices has been challenging, as different versions of an application must generally be developed for each mobile device platform, each requiring specialized software development skills and detailed knowledge of specific development languages with a general lack of commonality and compatibility between common mobile device platforms. In addition, many popular mobile device platforms require specialized software development and/or compilation of applications for their mobile device platform to be completed on a particular type or configuration of computer system. For example, applications for Apple's iPhone™ require development on an Apple™ hardware architecture and Apple™ software configuration including developing an application in the Objective C language and compiling the application using multiple software components such as Xcode and the iPhone™ software development kit (SDK), for example. Similarly, applications for Blackberry™ and Windows Mobile™ mobile devices require development on a machine running Microsoft Windows™ and with a particular software configuration including multiple specific development and compiling software components and tools, while applications for the Android™, Nokia™, Symbian™, Palm Pre™ and W3C™ Widgets mobile device platforms may be developed on machines running several types of operating systems, but each require specific and differing software configurations for application development and compiling. Also, the process for compiling or building a mobile device application for a single particular platform, such as those noted above, has commonly required execution of multiple command line steps, adding to the time and effort required to build multiple versions of a particular application for use on individual mobile device platforms.

Further complicating the development of mobile device software applications for multiple mobile device platforms has been the differing application programming interface (API) features and specifications for accessing and utilizing many of the native features and services available on each different mobile device platform. For example, the APIs and required application function calls required to access native features such as geolocation (such as provided by a global positioning system receiver in a mobile device), vibration, accelerometer, contacts, and other native features in common mobile device platforms are all different, requiring individual and specialized knowledge for developing native software applications for each platform. Such specialized and incompatible software development requirements has further made developing software applications for multiple mobile device platforms time consuming and inefficient using existing techniques and approaches.

Accordingly, in view of the above, a need exists for a system and method to facilitate the development of native mobile device applications for multiple different and typically incompatible mobile device platforms.

4. SUMMARY OF THE INVENTION

It is an object of the present invention to provide a system and method for remotely compiling software applications for mobile devices that addresses some of the limitations of the prior art.

Another object of the present invention to provide a system and method for remotely generating native software applications for multiple mobile device platforms that addresses some of the limitations of the prior art.

It is a further object of the invention to provide a computer readable medium and computer implemented method of automated remote compiling of native mobile device applications for multiple mobile device platforms, that addresses some of the limitations of the prior art.

According to an embodiment of the invention, a computer readable medium is provided, comprising executable instructions to: provide an SDK to a client computer comprising executable instructions for communicating with a build server, receive an HTML/Javascript source application and a configuration file referencing one or more files of said source application over a computer network from a client computer to said build server, transmit said HTML/Javascript source application and said configuration file to multiple compile servers corresponding to each of multiple mobile device platforms, combine said HTML/Javascript source application with a mobile device platform specific framework source code for each said mobile device platform on each said compile server, compile said HTML/Javascript source application and said framework source code on said compile server to output an executable native application for each said mobile device platform, and transmit each said executable native application from said compile server to said client computer over a computer network.

According to another embodiment, a computer readable medium is provided, comprising executable instructions to: receive an HTML/Javascript source application and a configuration file comprising developer certificates corresponding to multiple mobile device platforms over a computer network from a client computer to a build server, transmit said HTML/Javascript source application and said configuration file to multiple compile servers corresponding to each of said multiple mobile device platforms, combine said HTML/Javascript source application with a mobile device platform specific framework source code for each said mobile device platform on each said compile server, compile said HTML/Javascript source application and said framework source code on said compile server to output an executable native application for each said mobile device platform, sign each said executable native application using said developer certificate corresponding to each said executable native application to output a signed native application for each said mobile device platform, and transmit each said signed native application from said compile server to said client computer over a computer network.

According to a further embodiment of the invention, a computer implemented method for automated remote compiling of native applications for multiple mobile device platforms, the method comprising: providing an SDK to a client computer comprising computer executable instructions for communicating with a build server over a computer network, receiving an HTML/Javascript source application and a configuration file referencing one or more files of said source application over a computer network from a client computer to said build server, transmitting said HTML/Javascript source application and said configuration file to multiple compile servers corresponding to each of multiple mobile device platforms, combining said HTML/Javascript source application with a mobile device platform specific framework source code for each said mobile device platform on each said compile server, compiling said HTML/Javascript source application and said framework source code on said compile server to output an executable native application for each said mobile device platform, and transmitting each said executable native application from said compile server to said client computer over a computer network.

Further advantages of the invention will become apparent when considering the drawings in conjunction with the detailed description.

5. BRIEF DESCRIPTION OF THE DRAWINGS

The system and method of the present invention will now be described with reference to the accompanying drawing figures, in which.

Like reference numerals refer to corresponding parts throughout the several views of the drawings.

6. DETAILED DESCRIPTION OF THE INVENTION

Figure 1:
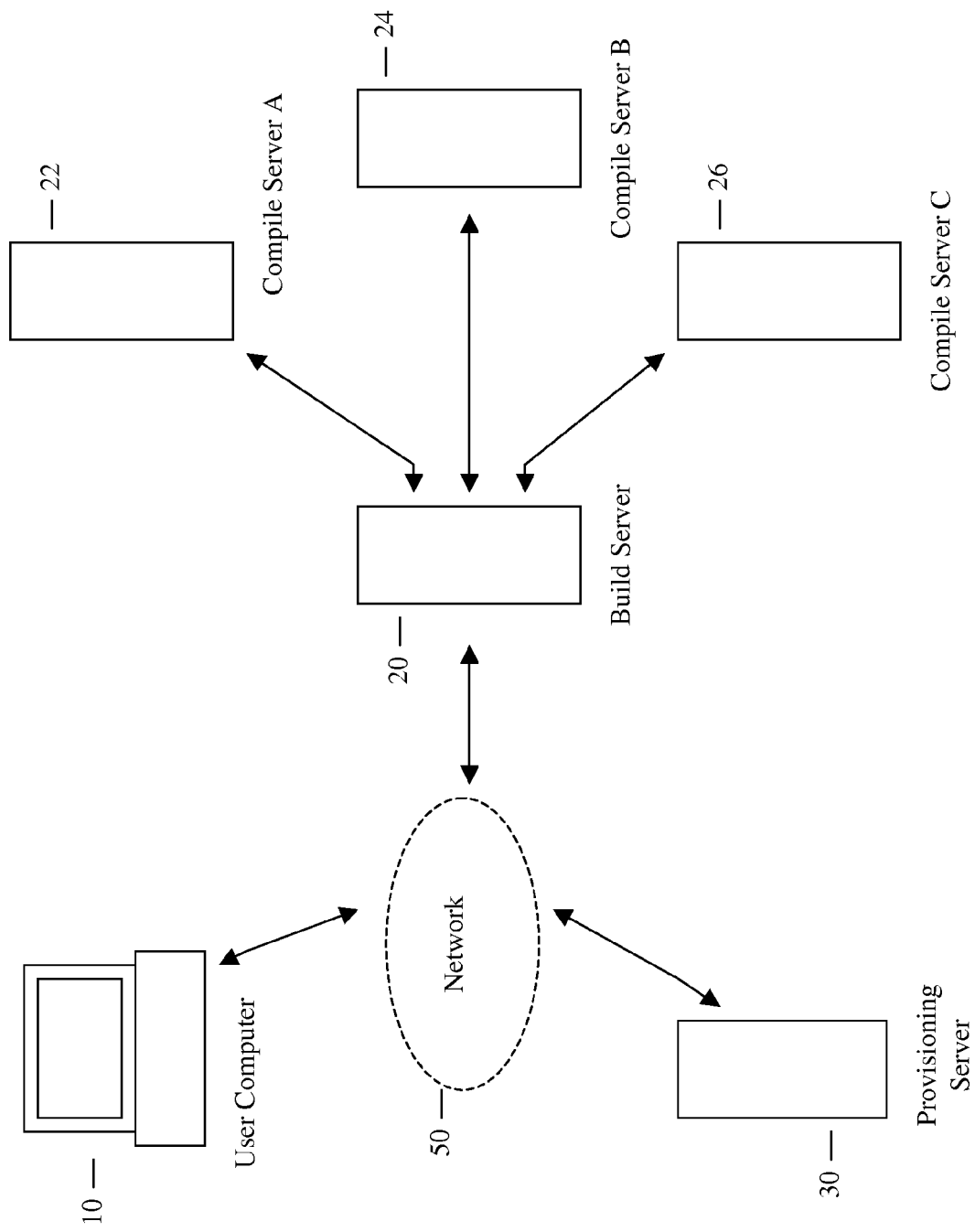
FIG. 1 illustrates an exemplary network architecture for implementing an embodiment of the present invention.

FIG. 1 illustrates an exemplary network architecture environment in which embodiments of the present invention may be implemented. The networked environment includes a user computer 10 connected to a communication network 50, which may include one or more of: a local area network, wide area network, world wide web (WWW), or the global Internet, for example, such that user computer 10 may communicate with other computers similarly connected to network 50. Other computers connected to network 50 may include a build server 20, and optional provisioning server 30, which may each communicate with any other computer connected to the network 50. Optionally, compile servers, such as compile servers 22, 24 and 26, for example, may also connect to network 50, either through build server 20 as shown in FIG. 1, or optionally by direct connection to network 50 in an embodiment not shown. User computer 10 includes standard computing components for transmitting and receiving data to and from other computers connected to the user computer 10 through network 50.

Build server 20 includes standard computing components for transmitting and receiving data to and from other computers connected over the network 50, including user computer 10, compile servers 22, 24 and 26, and optionally also optional provisioning server 30. In particular, build server 20 includes or is connected to at least one storage repository (not shown) for storing data which may be transmitted or received to or from other computers. Such storage repository may comprise a conventional data storage device such as a hard disk or solid-state memory located with and connected directly to build server 20, or may alternatively comprise a remote data storage repository connected to build server 20, such as a network storage appliance, for example. Such build server storage repository may comprise a software development kit or SDK which may be accessed by a user computer 10 and provided to the user computer 10 over network 50. Such an SDK may comprise one or more software development tools which may be executed on a user computer 10 to facilitate development of software applications for multiple mobile device platforms. In one embodiment, the SDK may comprise a script or program, expressed in any suitable scripting or programming language for example, to facilitate communication between a user computer 10 and the build server 20 over a computer network 50, such as for transmitting HTML/Javascript software applications and other data from a user computer 10 to be received by the build server 20. In another embodiment, the SDK may optionally also comprise one or more software development programs to facilitate development of mobile device applications such as an emulator program to emulate multiple mobile device platforms for use in testing and/or debugging of mobile device applications written by a user on a user computer 10, or a plugin application for an integrated development environment running on a user computer 10, to facilitate development of mobile device applications on the user computer 10, and transmission of such mobile device applications over the computer network 50 to be received by the build server 20 for compiling for execution on multiple mobile device platforms.

Compile Server A 22 includes standard computing components for sending and receiving data to and from build server 20. Compile Server A 22 also comprises particular computing components for receiving an HTML/Javascript source mobile device application from build server 20, and for compiling the HTML/Javascript source application into an executable native application for at least one particular mobile device platform. In one embodiment, compile server A 22 comprises an Apple Macintosh™ computer system including an Apple™ operating system executing on compile server A 22, that is suitable for compiling a HTML/Javascript source application received from build server 20 into an executable native application for an Apple™ mobile device platform, such as the iPhone™ platform, for example. In particular, compile server A 22 includes or is connected to at least one compile storage repository (not shown) for storing data which may be transmitted and/or received from other computers, such as HTML/Javascript applications received from build server 20, or compiled executable native mobile phone applications, for example. Such compile storage repository may comprise any suitable data storage device such as a hard disk or solid-state memory located with and connected directly to compile server A 22, or may alternatively comprise a remote data storage repository connected to compile server A 22, such as a network storage appliance, for example. Such compile server storage repository may comprise at least one framework source code package, which may be combined with an HTML/Javascript source application received from build server 20, in preparation for compiling to output an executable native mobile device application for a particular mobile device platform, such as the Apple iPhone™ platform, for example. In another embodiment, compile server A 22 or an associated compile storage repository may also comprise additional data for use in compiling mobile device applications, such as additional source code or applications related to additional or optional features which may be added to a compiled executable native mobile device application during compiling, for example.

Similar to as described above, compile server B 24 includes standard computing components for sending and receiving data to and from build server 20. Compile Server B 24 also comprises particular computing components for receiving an HTML/Javascript source mobile device application from build server 20, and for compiling the HTML/Javascript source application into an executable native application for at least one particular mobile device platform. In one embodiment, compile server B 24 comprises a Linux and/or UNIX™ server computer system including a Linux and/or UNIX™ operating system executing on compile server B 24, that is suitable for compiling a HTML/Javascript source application received from build server 20 into an executable native application for at least one of: an Android™, Palm Pre™, Nokia™, Symbian™ and W3C™ Widget mobile device platforms, for example. In particular, compile server B 24 includes or is connected to at least one compile storage repository (not shown) for storing data which may be transmitted and/or received from other computers, such as HTML/Javascript source applications received from build server 20, or compiled executable native mobile phone applications, for example. Such compile storage repository may comprise any suitable data storage device such as a hard disk or solid-state memory located with and connected directly to compile server B 24, or may alternatively comprise a remote data storage repository connected to compile server B 24, such as a network storage appliance, for example. Such compile server storage repository may comprise at least one framework source code package, which may be combined with an HTML/Javascript source application received from build server 20, in preparation for compiling to output an executable native mobile device application for a particular mobile device platform, such as Android™, Palm Pre™, Nokia™, Symbian™ and W3C™ Widget mobile device platforms, for example. In another embodiment, compile server B 24 or an associated compile storage repository may also comprise additional data for use in compiling mobile device applications, such as additional source code or applications related to additional or optional features which may be added to a compiled executable native mobile device application during compiling, for example.

Further and similar to as described above, compile server C 26 also includes standard computing components for sending and receiving data to and from build server 20. Compile Server C 26 also comprises particular computing components for receiving an HTML/Javascript source mobile device application from build server 20, and for compiling the HTML/Javascript source application into an executable native application for at least one particular mobile device platform. In one embodiment, compile server C 26 comprises a Microsoft Windows™ server computer system including a Microsoft Windows™ operating system executing on compile server C 26, that is suitable for compiling a HTML/Javascript source application received from build server 20 into an executable native application for at least one of: Windows Mobile™ and Blackberry™ mobile device platforms, for example. In particular, compile server C 26 includes or is connected to at least one compile storage repository (not shown) for storing data which may be transmitted and/or received from other computers, such as HTML/Javascript source applications received from build server 20, or compiled executable native mobile phone applications, for example. Such compile storage repository may comprise any suitable data storage device such as a hard disk or solid-state memory located with and connected directly to compile server C 26, or may alternatively comprise a remote data storage repository connected to compile server C 26, such as a network storage appliance, for example. Such compile server storage repository may comprise at least one framework source code package, which may be combined with an HTML/Javascript source application received from build server 20, in preparation for compiling to output an executable native mobile device application for a particular mobile device platform, such as Windows Mobile™ and Blackberry™ mobile device platforms, for example. In another embodiment, compile server C 26 or an associated compile storage repository may also comprise additional data for use in compiling mobile device applications, such as additional source code or applications related to additional or optional features which may be added to a compiled executable native mobile device application during compiling, for example.

Optional provisioning server 30 includes standard computing components for sending and receiving data to and from other computers connected to network 50. In particular, optional provisioning server 30 is connected to at least one provisioning storage repository (not shown). Such provisioning repository may comprise any suitable data storage device such as a hard disk or solid-state memory located with and connected directly to provisioning server 30, or may comprise a remote data storage facility connected to provisioning server 30. In one embodiment, optional provisioning server 30 may comprise executable native mobile device applications for multiple mobile device platforms, which may be received over computer network 50 from build server 20, either directly, or optionally through a user computer 10. Optional provisioning server 30 may also optionally be accessible by one or more mobile devices on multiple mobile device platforms, such by over computer network 50, to connect to mobile devices (directly or through another user computer, for example) to transmit executable native mobile device applications corresponding to one of multiple mobile device platforms to mobile devices for installation and use on each such mobile device, for example. In one embodiment, optional provisioning server 30 may provide executable native mobile device applications for multiple mobile device platforms to a restricted set of mobile device users, such as to a corporate group of multi-platform mobile devices related to a corporation, for example. In another embodiment, optional provisioning server 30 may comprise one or more public distribution services for providing mobile device applications to one or more particular type of mobile device platform, such as the Apple iTunes App Store™ for iPhone™ mobile devices, the Blackberry AppWorld™ store for Blackberry™ mobile devices, the Android Marketplace™ for Android™ mobile devices, and the Palm Pre App Catalog™ for Palm Pre™ mobile devices, for example.

Figure 2:
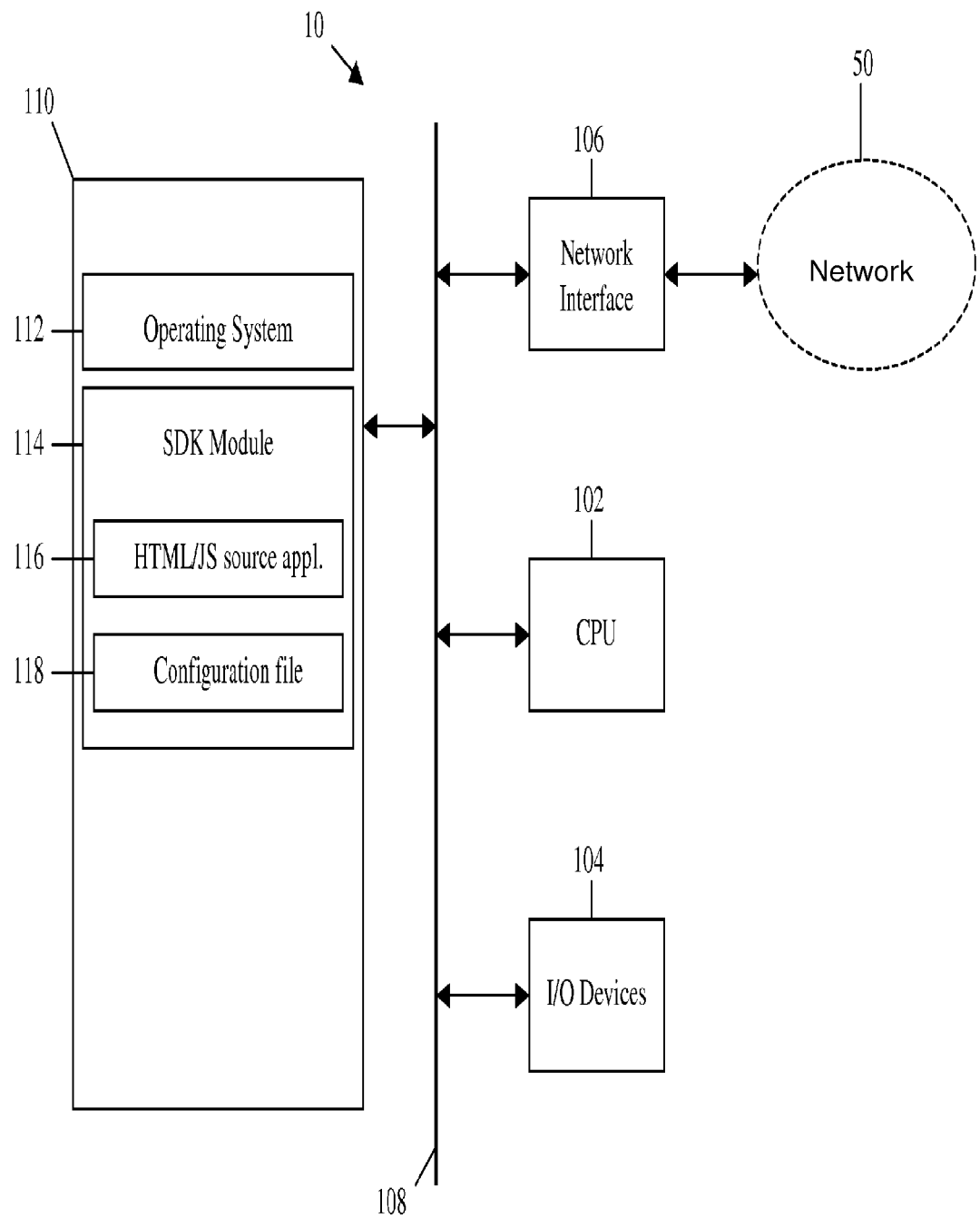
FIG. 2 illustrates an exemplary user computer architecture configured according to an embodiment of the invention.

FIG. 2 illustrates an exemplary computer architecture for a user computer 10 configured in accordance with an embodiment of the invention. The computer 10 includes standard components, including a central processing unit 102 and input/output devices 104, which are linked by a bus 108. The input/output devices 104 may comprise a keyboard, mouse, touch screen, monitor, printer, and the like, for example. A network interface 106 is also connected to the bus 108. The network interface 106 provides connectivity to a network 50, such as the exemplary computer network 50 described above, thereby allowing the computer 10 to operate in a networked environment. Also connected to the bus 108 is a computer-readable memory 110. The memory 110 stores executable instructions to implement functions of the invention. The computer-readable memory 110 may comprise any available computer-readable media or device as may be known in the art, that can be accessed by the computer 10.

In an embodiment of the invention, one or more of the following program modules and data files may be stored in the memory 110 of the computer 10: an operating system module 112, and a software development kit or SDK module 114.

The operating system module 112 may comprise any known executable operating system instructions, such as may be suitable for controlling the general operations of a networked user computer 10, and in particular may comprise instructions for handling various system services, such as file services or for performing hardware dependent tasks. Operating system module 112 may also comprise instructions for standard computer operation, including receiving input from input devices such as a keyboard or mouse, and for displaying output in a graphical format on a monitor, for example. In particular embodiments, operating system module 112 may comprise one or more known proprietary or open-source computer operating systems, such as for example, Windows™, MacOS™, UNIX™ or Linux™ operating systems.

The exemplary SDK module 114 comprises instructions for communicating with a build server 20 over a computer network, to transmit data from the user computer 10, such as mobile device software application source code, to be received by the build server 20. In one embodiment, the SDK module 114 includes an exemplary mobile device platform-independent HTML/Javascript source application 116 for transmission from the user computer 10 to be received by the build server 20. The exemplary HTML/Javascript source application 116 may be stored as a sub-module of SDK module 114, and may comprise one or more data files including HTML/Javascript code, as well as optionally one or more of: cascading style sheet (CSS) files, icon files, multimedia (image, audio, video) files, or other data files comprising part of the HTML/Javascript source application. In such a manner, the HTML/Javascript source application 116 may comprise a software application intended for use on multiple mobile device platforms and expressed as an HTML/Javascript web application. In an embodiment of the invention, the SDK module 114 includes instructions to transmit an exemplary configuration data file 118 from the user computer 10 over computer network 50 to be received by the build server 20 in conjunction with an HTML/Javascript source application 116. The configuration file 118 may be stored as a sub-module of SDK module 114, and may preferably reference the one or more data files comprising the HTML/Javascript source application 116, such as an HTML and/or Javascript file, and optionally also one or more of CSS, icon, multimedia or other related files comprising part of application 116. In another embodiment, configuration file 118 may further include specification of one or more options for compiling of the HTML/Javascript source application 116, such as which mobile device platforms for which application 116 is to be compiled, or additional program features to be added during compilation of application 116, for example. In a particular embodiment, the configuration file 118 may comprise a Javascript Object Notation (JSON) file including references to one or more files comprising the HTML/Javascript source application 116, and/or one or more options for compiling the HTML/Javascript source application 116 by a compile server, for example. In another embodiment, configuration file 118 may also comprise one or more developer verification certificates, such as to verify the identity and/or authority of a developer of an HTML/Javascript source application during or following the compilation process to produce an executable native mobile device application, for example, or alternately may comprise references to one or more developer verification certificates.

In one embodiment, the SDK module 114 may be downloaded by the user computer 10 from the build server 20, and may include instructions executable by the user computer 10 to communicate with the build server 20, such as to transmit a source application 116 and/or configuration file 118 to the build server 20, or to receive a compiled executable native mobile device application from the build server 20, for example. In a simplistic embodiment, the SDK module 114 may comprise a relatively simple script or similar code, including instructions executable by the user computer to communicate with build server 20 such as to transmit source application 116 and/or configuration file 118 to build server 20, and optionally also to receive one or more compiled executable native mobile device application from build server 20.

In a particular embodiment, SDK module 114 may comprise part of an integrated development environment (IDE) running on user computer 10. In such a case, SDK module 114 may comprise a plugin for an IDE, and may include instructions for communicating with build server 20 over computer network 50, such as to transmit an HTML/Javascript source application 116 and configuration file 118 written using the IDE on the user computer 10 over computer network 50, to be received by the build server 20, for example. In such an embodiment, the IDE running on user computer 10 and used to write the HTML/Javascript source application 116 may be any suitable known IDE tool available for developing HTML/Javascript based applications, such as Eclipse™, Visual Studio™, Dreamweaver™, Textmate™ and Xcode™ IDEs, for example. In such an embodiment, the SDK module 114 may comprise a plugin for an IDE and may be downloaded to the user computer 10 from the build server 20. In such case, SDK module 114 may comprise instructions executable by the user computer 10 within the IDE, to communicate with the build server 20, such as to transmit a source application 116 and/or configuration file 118 to the build server 20, or to receive a compiled executable native mobile device application from the build server 20, for example.

In a further embodiment, SDK module 114 may comprise part of a custom program for developing HTML/Javascript source applications 116 on a user computer 10, such as a mobile device emulator program, for example. In such an embodiment, the mobile device emulator program or other custom program may be used to write and/or test/debug an HTML/Javascript source application, as well as to transmit the source application and configuration file to be received by the build server 20. In such an embodiment, the SDK module 114 may comprise a mobile device emulator and may be downloaded to the user computer 10 from the build server 20. In such case, SDK module 114 may comprise instructions executable by the user computer 10 to provide emulation of one or more mobile device platforms, and also to communicate with the build server 20, such as to transmit a source application 116 and/or configuration file 118 to the build server 20, or to receive a compiled executable native mobile device application from the build server 20, for example.

In an optional embodiment of the present invention, the SDK module 114 may additionally comprise an optional status sub-module (not shown), comprising instructions to communicate with a build server 20 over network 50, to receive status information regarding the status of a compiling process for an HTML/Javascript source application transmitted to the build server 20 from the user computer 10. More particularly, such status sub-module of SDK module 114 may comprise instructions to communicate with an optional status module 218 on build server 20, and may receive either static and/or dynamically updating status information from build server 20 indicating the status of the compilation of an HTML/Javascript source application 116 transmitted from the user computer 10, until the compilation of multiple platform-specific executable mobile device applications is completed, for example. Such status sub-module of SDK module 114 may also optionally comprise instructions to request status information from the build computer 20, and such instructions may be executed on the user computer 10 from a control line interface, or from within an IDE or custom program such as a mobile device emulator program running on user computer 10, for example, such as are described above. Accordingly, a status sub-module of SDK module 114 may further comprise instructions to display status information received from build server 20 on user computer 10, such as at a command line interface, or within an IDE or custom program such as a mobile device emulator, for example.

The above described program modules incorporate instructions to implement processing operations associated with aspects of the invention. Various embodiments of the processing operations of the above-described program modules are described below with reference to FIGS. 5-6. The modules stored in memory 110 are exemplary, and additional modules can be included. It should be appreciated that the functions of the presented modules may be combined. In addition, a function of a module need not be performed on a single machine, instead, the function may be distributed across a network to one or more other computers if desired, for example. It is the functions of the invention that are significant, not where they are performed or the specific manner in which they are performed.

Figure 3:
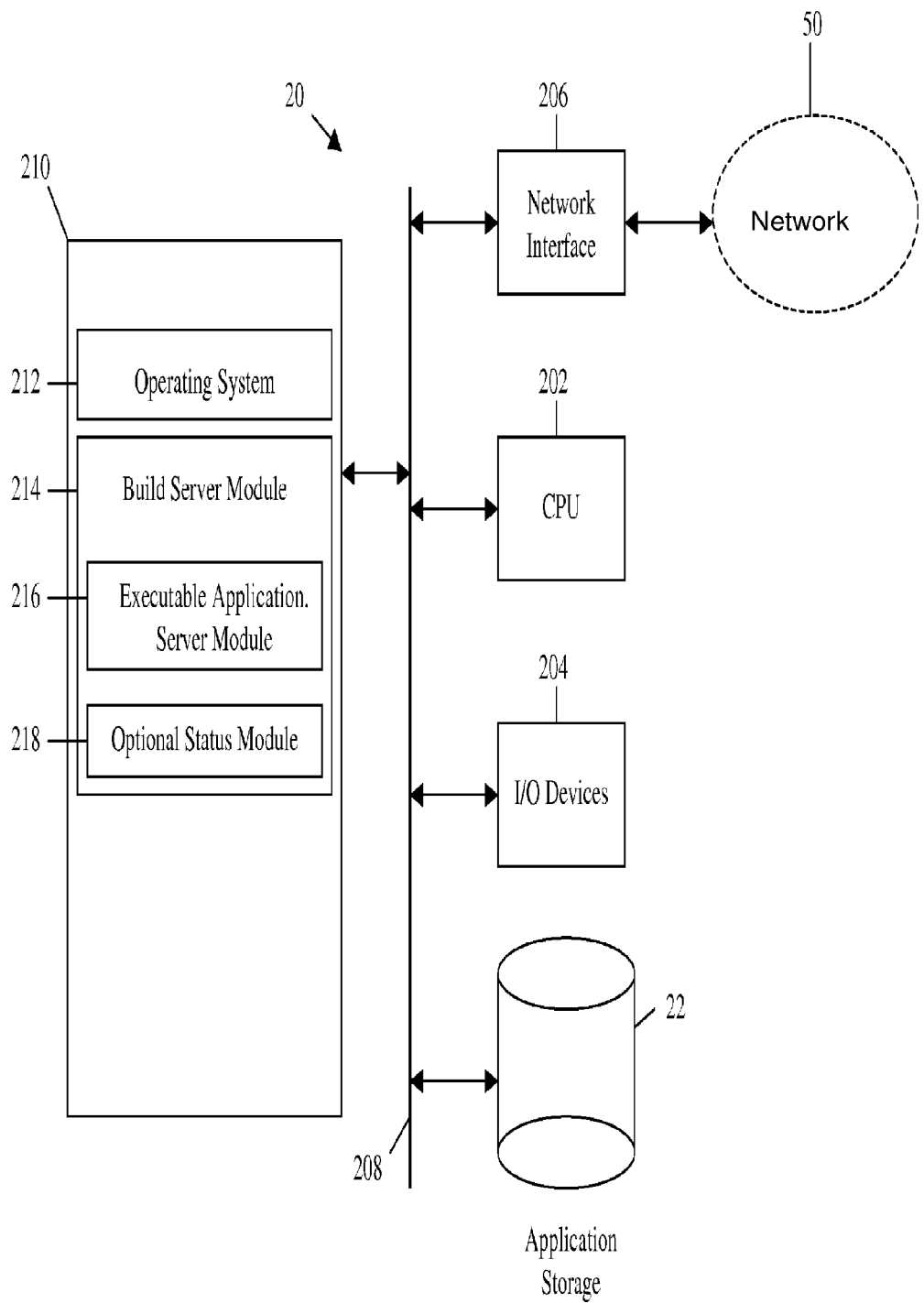
FIG. 3 illustrates an exemplary build server computer architecture configured according to an embodiment of the invention.

FIG. 3 illustrates an exemplary computer architecture for a build server computer 20, such as illustrated in the computer system of FIG. 1, configured in accordance with an embodiment of the invention. The build server 20 includes standard components, including a central processing unit 202 and input/output devices 204, which are linked by a bus 208. The input/output devices 204 may comprise a keyboard, mouse, touch screen, monitor, printer, and the like, for example. A network interface 206 is also connected to the bus 208. The network interface 206 provides connectivity to a network 50, such as the exemplary computer network 50 described above, thereby allowing the build server 20 to operate in a networked environment. Build server 20 also comprises an application storage repository 22 capable of storing one or more HTML/Javascript source applications received from a user computer 10, and/or one or more compiled executable native mobile device applications, received from one or more of compile servers A 22, B 24 and C 26, which have been compiled for a specific mobile device platform. Application storage repository 22 may comprise a conventional data storage device such as a hard disk or solid-state memory located with and connected directly to build server 20 such as by bus 208 as shown in FIG. 3, or may alternately comprise a remote data storage facility accessibly connected to build server 20. Also connected to the bus 208 is a computer-readable memory 210. The memory 210 stores executable instructions to implement functions of the invention. The computer-readable memory 210 may comprise any available computer-readable media or device that can be accessed by the build server 20.

In an embodiment of the invention, one or more of the following program modules and data files may be stored in the memory 210 of the build server computer 20: an operating system module 212, a build server module 214, an executable application server module 216, and an optional status module 218

Similar to operating system module 112 described above in reference to FIG. 2, the operating system module 212 may comprise instructions for handling various system services for build server computer 20, such as file services or for performing hardware dependant tasks. Operating system module 212 may also comprise instructions for standard computer operation, including receiving input from input devices such as a keyboard or mouse, and for displaying output in a graphical format on a monitor, for example. In one embodiment, operating system module 212 may comprise a particular operating system platform, such as any suitable known operating system such as Microsoft Windows™, MacOS™, UNIX™ and Linux™, for example. In a particular embodiment, operating system module 212 may comprise a Linux™ operating system, and more particularly, a Linux™ web server operating system, such as an Apache™ server operating system, for example.

The build server module 214 comprises instructions for receiving data from a user computer 10, including receiving an HTML/Javascript source application 116 for compiling to form multiple mobile device-specific executable native mobile device applications, and/or to receive a configuration data file 118 associated with the HTML/Javascript source application to be compiled 116. The build server module 214 also comprises instructions to transmit and receive data to and from one or more compile servers such as compile servers A 22, B 24, and C 26. In a particular embodiment, build server module 214 comprises instructions to transmit an HTML/Javascript source application 116 and configuration file 118 received from a user computer 10, to one or more compile servers 22, 24, 26, to be compiled into multiple platform-specific executable native mobile device applications. In one embodiment, build server module 214 may optionally store a copy of an HTML/Javascript source application 116 and configuration file 118 received from a user computer in build server application storage repository 22 prior to or in conjunction with transmitting the HTML/Javascript source application 116 and configuration file 118 to one or more compile servers 22, 24, 26. In a further embodiment, build server module 214 may additionally comprise instructions to receive multiple platform specific executable native mobile device applications from one or more compile servers 22, 24, 26, following compilation.

Build server module 214 may also comprise an executable application server sub-module 216, which comprises instructions to provide multiple platform-specific executable native mobile device applications received from one or more compile servers to a user computer 10. In one embodiment, following receipt of multiple platform-specific executable mobile device applications from one or more compile servers 22, 24, 26, the executable application server module 216 may comprise instructions to transmit the multiple platform-specific executable mobile device applications directly to a user computer 10, such as over network 50, or alternatively may transmit the executable applications to one or more provisioning servers 30 for distribution to mobile device users. In a further embodiment, executable application server module 216 may comprise instructions to provide the multiple platform-specific executable mobile device applications to either a user computer 10 or to one or more provisioning servers 30 by means of providing a static uniform resource locator (URL) referencing each mobile device application, such that the multiple mobile device applications may be accessed from the build server 20 such as over network 50. Such static URL links provided by build server 20 may preferably also be predictable, such as by use of a common URL structure associated with each user computer 10 for providing the multiple mobile device applications, for example.

Build server module 214 may optionally also comprise an optional status sub-module 218, which comprises instructions to provide status information to a user computer 10 regarding the status of compilation for an HTML/Javascript source application 116 received from the user computer 10. In one embodiment, optional status module 218 may comprise instructions to provide static and/or dynamically updated status indicator information to a user computer 10 indicating the status of the compilation of an HTML/Javascript source application 116 received from the user computer, until the compilation of multiple platform-specific executable mobile device applications is completed, for example. In an alternative optional embodiment, status module 218 may comprise instructions to send one or more status messages to a user computer 10 providing status information for the compilation of an HTML/Javascript source application received from the user computer 10.

Figure 4:
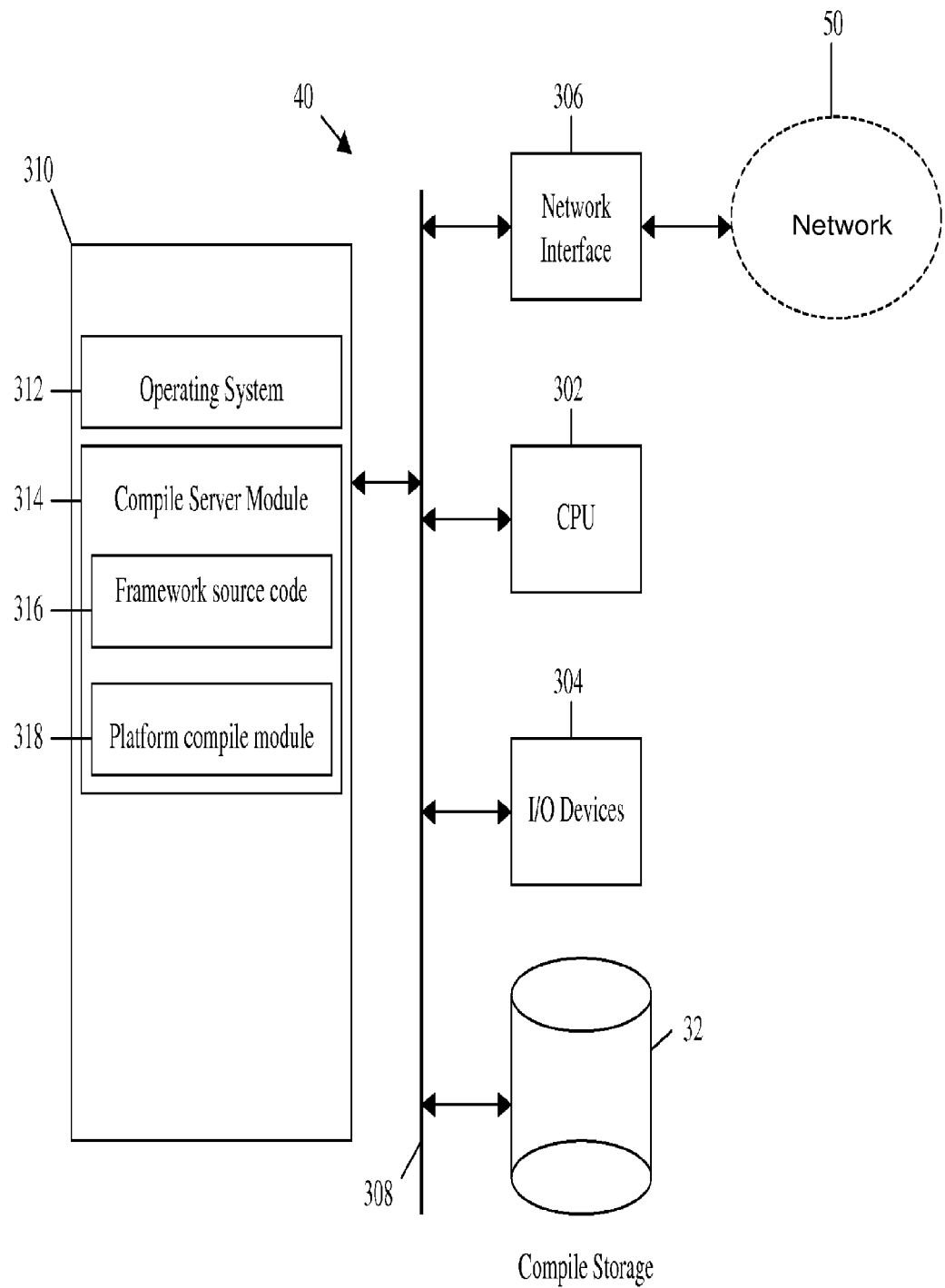
FIG. 4 illustrates an exemplary compile server computer architecture configured according to an embodiment of the invention.

FIG. 4 illustrates an exemplary computer architecture for an exemplary compile server computer 40, such as compile servers A 22, B 24, and C 26, as illustrated in the computer system of FIG. 1, as configured in accordance with an embodiment of the invention. The exemplary compile server computer 40 includes standard components, including a central processing unit 302 and input/output devices 304, which are linked by a bus 308. The input/output devices 304 may comprise a keyboard, mouse, touch screen, monitor, printer, and the like, for example. A network interface 306 is also connected to the bus 308. The network interface 306 provides connectivity to a network 50, such as the exemplary computer network 50 described above, thereby allowing the compile server 40 to operate in a networked environment. Exemplary compile server 40 also comprises a compile storage repository 32 capable of storing one or more HTML/Javascript source applications 116, and/or one or more mobile platform specific executable native mobile device applications, for example. Compile storage repository 32 may comprise a conventional data storage device such as a hard disk or solid-state memory located with and connected directly to compile server 40 such as by bus 308 as shown in FIG. 4, or may alternately comprise a remote data storage facility accessibly connected to compile server 40. Also connected to the bus 308 is a computer-readable memory 310. The memory 310 stores executable instructions to implement functions of the invention. The computer-readable memory 310 may comprise any available computer-readable media or device that can be accessed by the compile server 40.

In an embodiment of the invention, one or more of the following program modules and data files may be stored in the memory 310 of the exemplary compile server 40: an operating system module 312, a compile server module 314, a framework source code sub-module 316, and platform compile sub-module 318.

Similar to module 212 described above in reference to FIG. 3, the operating system module 312 may comprise instructions for handling various system services for compile server 40, such as file services or for performing hardware dependant tasks. Operating system module 312 may also comprise instructions for standard computer operation, including receiving input from input devices such as a keyboard or mouse, and for displaying output in a graphical format on a monitor, for example.

Compile server module 314 comprises instructions for receiving an HTML/Javascript source application 116 and/or an associated configuration file 118 from build server 20, and combining the HTML/Javascript source application 116 with one or more mobile device platform-specific framework source code files, in preparation for compiling a corresponding mobile device platform-specific executable native application. Compile server module 314 also comprises instructions for passing the combined HTML/Javascript source application and platform-specific source code to the platform compile sub-module 318 for mobile device platform-specific compilation. Compile server module 314 further comprises instructions to transmit the compiled platform-specific executable native mobile device application output by platform compile sub-module 318 to be received by build server 20.

In an optional embodiment of the invention, compile server module 314 may additionally comprise instructions to combine the HTML/Javascript source application 116 received from build server 20 with one or more optional source code files as may be specified in the configuration file 118 received from build server 20, such as to add optional features to the HTML/Javascript source application 116 prior to compiling. In such an optional embodiment, optional source code files may be combined with the HTML/Javascript source application 116 either before or after the mobile device platform-specific framework source code is combined with the source application 116. As described above, optional source code may comprise source code instructions to include one or more of: advertising features such as ad-ware for displaying advertising in a mobile device application, analytical features such as tracking and reporting user patterns and statistics, validation features such as validating the HTML/Javascript source application prior to or during compiling, optimization features such as optimizing HTML/Javascript source application to optimize compilation and/or execution of a mobile device application, obfuscation features such as obfuscating and/or minifying HTML/Javascript source application to reduce likelihood of reverse-compilation and further optimize execution of a mobile device application, for example.

Framework source code sub-module 316 comprises framework source code instructions to enable an HTML/Javascript application programming interface (API) to expose native functions and/or features for a mobile device platform. Such native functions and/or features for a mobile device platform may comprise one or more of geolocation (such as GPS), accelerometer, sound, camera, vibration, contacts and local or offline storage, for example, which may be available only to native mobile device applications running on a particular mobile device platform. The framework source code instructions may be combined with an HTML/Javascript source application 116 (may also be referred to as a code wrapper for an HTML/Javascript source application) such that when the resulting combined source application and framework source code are compiled, an executable native mobile device application is produced. Framework source code sub-module 316 comprises framework source code instructions for at least one specific mobile device platform, such as for one or more of iPhone™, Android™, Nokia™, Symbian™, Windows Mobile™, Palm Pre™, and Blackberry™ mobile device platforms, for example.

Platform compile module 318 comprises instructions to compile the combined HTML/Javascript source application and framework source code as required for at least one specific mobile device platform, to produce an executable native mobile device application for a particular mobile device platform. Accordingly, platform compile module 318 comprises instructions and installed software components required for compiling applications for at least one specific mobile device platform. In one exemplary embodiment where compile server 40 is an exemplary Apple xServe™ compile server operable to compile iPhone™ mobile device applications, platform compile module 318 comprises all required instructions to compile an executable native iPhone™ application, including the Apple xCodebuild™ tool, and the Apple iPhone™ SDK instructions, for example. In a further exemplary embodiment where compile server 40 is an exemplary Linux™ compile server operable to compile Android™ mobile device applications, platform compile module 318 comprises all required instructions to compile an executable native Android™ application, including Java™ 1.5, Android™ Ant tool and Android SDK™ instructions, for example.

In a particular embodiment, platform compile module 318 additionally comprises instructions to authenticate a compiled executable native mobile device application for a specific mobile device platform. For example, in an exemplary Apple xServe™ compile server for compiling iPhone™ applications according to such particular embodiment, the platform compile module 318 additionally comprises instructions to authenticate the compiled executable native iPhone™ application using a developer certificate received from user computer 10, and transmitted to compile server 40 by build server 20.

Figure 5:
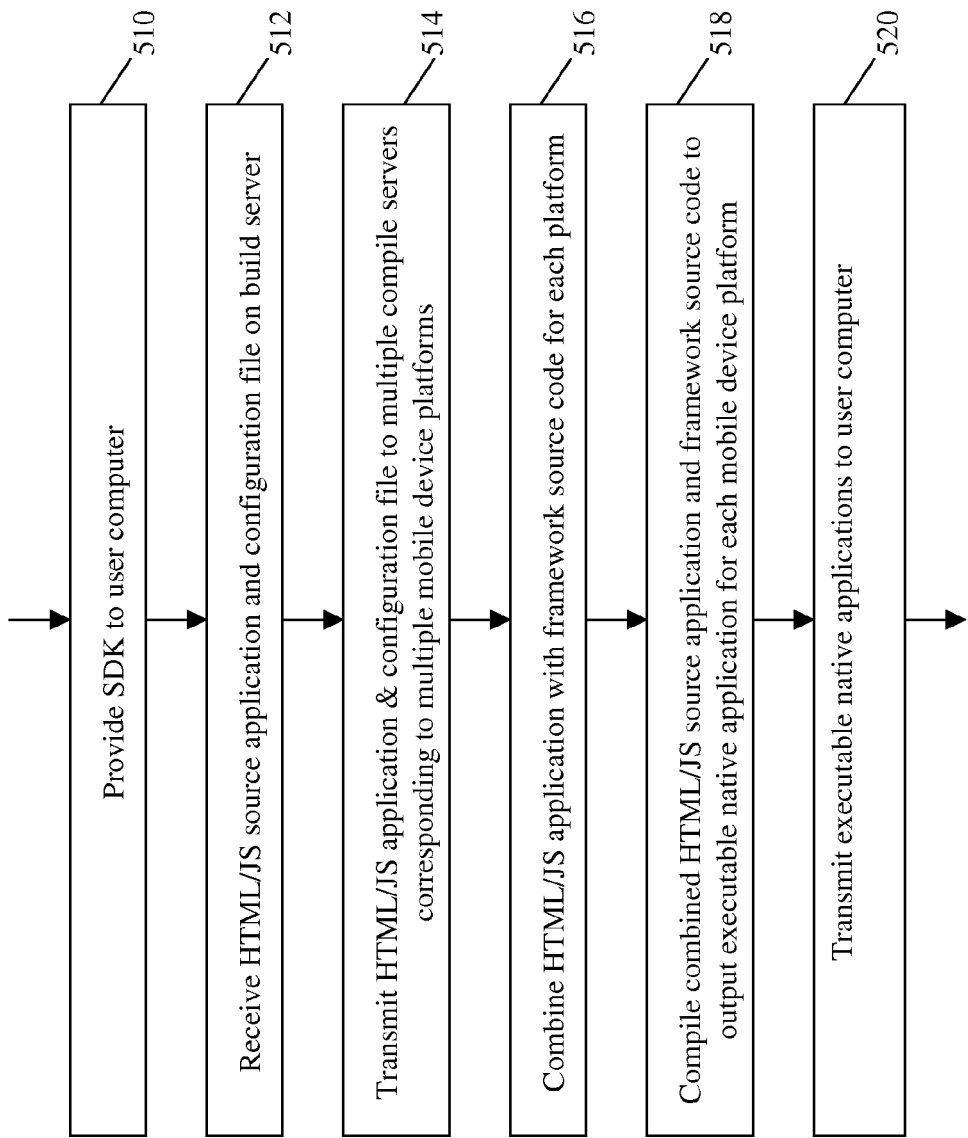
FIG. 5 illustrates a series of processing operations associated with an embodiment of the invention.

FIG. 5 illustrates a series of processing operations that may be implemented by the system illustrated in FIG. 1, and the exemplary computers illustrated in FIGS. 2-4, according to an embodiment of the invention. In the first processing operation 510 of FIG. 5, an SDK is provided to a user computer 10. In an embodiment of the invention, the SDK is provided to the user computer 10 by the build server 20, such as by build server module 214 running on build server 20. The SDK may be provided by build server 20 to user computer 10 such as over computer network 50, according to known methods. In an alternative embodiment, the SDK may be provided to user computer 10 from another source, such as from another web server computer, or by providing the SDK on a computer-readable memory medium, such as an optical disk or solid state memory device, for example. The SDK provided to user computer 10 may preferably be installed and run on user computer 10, such as within SDK module 114. As described above, the SDK provided to user computer 10 comprises instructions executable by a user computer 10 to communicate with a build server 20 over a computer network 50. In a simplistic embodiment, the SDK may comprise a script or other executable file comprising instructions for user computer 10 to communicate with build server 20, such as to transmit an HTML/Javascript source application 116 and/or associated configuration file 118 which may be written or otherwise stored on user computer 10 to the build server 20, and also to receive data returned from the build server 20. In another embodiment, the SDK may comprise a plugin or other interface component for an IDE on user computer 10, and may comprise instructions for the user computer 10 to transmit an HTML/Javascript source application 116 and/or configuration file 118 which may be authored in the IDE system on the user computer 10, to be received by the build server 20. In such an embodiment, the SDK may comprise an IDE plugin suitable for use in connection with any suitable known IDE environment in which an HTML/Javascript source application may be developed, such as Eclipse™, Visual Studio™, Dreamweaver™, Textmate™ and Xcode™ IDEs, for example. In yet a further embodiment, the SDK may comprise a custom program for developing and/or testing HTML/Javascript source applications, such as a mobile device platform emulator program, which may be used to write and/or test an HTML/Javascript source application, as well as to transmit the source application 116 and an associated configuration file 118 to be received by build server 20, for example.

In the second processing operation 512 of FIG. 5, an HTML/Javascript source application 116 and configuration file 118 are received on build server 20. Processing operation 512 may be implemented using build server module 214 on build server 20 to receive HTML/Javascript source application 116 and an associated configuration file 118 from user computer 10, such as over computer network 50 according to known methods. As described above, SDK module 114 on user computer 10 may be used to transmit the HTML/Javascript source application 116 and configuration file 118 to build server 20. HTML/Javascript source application 116 may comprise any suitable software application intended to be run on multiple mobile device platforms, and expressed as a web application using HTML/Javascript. In one embodiment, the HTML/Javascript source application 116 may comprise one or more data files including HTML/Javascript code, as well as optionally one or more of: cascading style sheet (CSS) files, icon files, multimedia (image, audio, video) files, or other data files comprising part of the HTML/Javascript source application. Further, as described above, configuration file 118 may comprise one or more references to one or more data files comprising the HTML/Javascript source application 116, such as an HTML and/or Javascript code file, and optionally also one or more of CSS, icon, multimedia or other related files comprising part of source application 116. In another embodiment, configuration file 118 may further include specification of one or more options for compiling of the HTML/Javascript source application 116, such as which mobile device platforms for which application 116 is to be compiled, or additional program features to be added during compilation of application 116, for example. In a particular embodiment, the configuration file 118 may comprise a Javascript Object Notation (JSON) file including references to one or more files comprising the HTML/Javascript source application 116, and/or one or more options for compiling the HTML/Javascript source application 116 by a compile server, for example. In another embodiment, configuration file 118 may also comprise one or more developer verification certificates, such as to verify the identity and/or authority of a developer of an HTML/Javascript source application during or following the compilation process to produce an executable native mobile device application, for example, or alternately may comprise references to one or more developer verification certificates. In a particular embodiment, the HTML/Javascript source application 116 and configuration file 118 may optionally be received in a compressed format, such as in a .zip compressed package, wherein the source application 116 and configuration file 118 may then be decompressed prior to later compiling steps conducted on compile servers 22, 24, 26, for example.

In the next processing operation 514 of FIG. 5, the HTML/Javascript source application 116 and configuration file 118 are transmitted to multiple compile servers 22, 24, 26 corresponding to multiple mobile device platforms. Processing operation 514 may be implemented using user build server module 214 on build server 20, which transmits the HTML/Javascript source application 116 and configuration file 118 to multiple compile servers 22, 24, 26 by means of data connections to compile servers 22, 24, 26, such as direct data connections, or alternatively by connection over a computer network, such as network 50, according to known methods. In one embodiment, exemplary compile server A 22 may comprise an Apple xServe™ compile server for compiling the HTML/Javascript source application 116 for native execution on the iPhone™ mobile device platform, in which case compile server A 22 may run Apple xCode™ development tools and the Apple iPhone™ SDK, as required for compilation of iPhone™ native applications, for example.

In another embodiment, exemplary compile server B 24 may comprise a Linux™ compile server for compiling the HTML/Javascript source application 116 for native execution on one or more of the Android™, Nokia™, Symbian™, Palm Pre™ and W3C Widget™ mobile device platforms. In such an embodiment, Linux™ compile server 24 may run Java™ 1.5, and the ANT and Android™ SDK for the Android™ platform, the S60 SDK for the Nokia™ and Symbian™ platforms, the palm-package tool for the Palm Pre™ platform, and a .zip compression tool for the W3C Widget platform, for example.

In yet a further embodiment, exemplary compile server C 26 may comprise a Windows™ compile server, for compiling the HTML/Javascript source application 116 for native execution on one or more of the Windows Mobile™ and Blackberry™ mobile device platforms. In such an embodiment, Windows™ compile server 26 may run Visual Studio 2008 Pro™, Microsoft ActiveSync™, .NET™ compact framework 2.0 and 3.5, and Windows Mobile™ 6.x SDK development tools for the Windows Mobile™ platform, and may run Java™ 1.6 JDK, the Blackberry™ JDK, and the Blackberry™ Signing Authority Tool for the Blackberry™ mobile device platform, for example.

In another embodiment, build server 20 may store a copy of the HTML/Javascript source application 116 and/or the associated configuration file 118, either prior to or following their transmission to the multiple compile servers 22, 24, 26 in processing operation 514. In such an embodiment, the HTML/Javascript source application 116 and/or the configuration file 118 may be stored using the build server application storage repository 22 connected to build server 20.

In the next processing operation 516 of FIG. 5, the HTML/Javascript source application 116 is combined with framework source code 316 for each mobile device platform. Processing operation 516 may be implemented using compile server module 314 running on each of compile servers 22, 24, 26, for each of the multiple mobile device platforms to which the HTML/Javascript source application 116 is to be compiled, to result in a combined HTML/Javascript application including the framework source code 316. As described above, a framework source code file 316 is defined for each of the mobile device platforms desired for compilation, to enable an HTML/Javascript application programming interface (API) to expose native functions and/or features for each of the corresponding mobile device platforms. Framework source code files 316 for each mobile device platform supported by a particular compile server 22, 24, 26, may be stored on compile server storage repository 32, for example. Such native functions and/or features exposed and enabled for each mobile device platform by the corresponding framework source code 316 may comprise one or more of: geolocation (such as GPS), accelerometer, sound, camera, vibration, contacts and local or offline storage function, for example, which may be available only to native mobile device applications running on a particular mobile device platform. The framework source code 316 (may also be referred to as a code wrapper for an HTML/Javascript source application) for a particular mobile device platform may be combined with the HTML/Javascript source application 116 by the compile server module 314 of the particular compile server corresponding to the particular mobile device platform such that when the resulting combined source application 116 and framework source code 316 are compiled, an executable native mobile device application is produced. For example, in an embodiment where compile server A 22 is an exemplary Apple xServe™ server 22 corresponding to the iPhone™ mobile device platform, the compile server module 314 may combine the HTML/Javascript source application 116 with an iPhone™ framework source code 316 retrieved from compile server storage repository 32, prior to compiling by the Apple xServe™ compile server 22. In another example where compile server B 24 is a Linux™ server for compiling applications for the Android™, Nokia™, Symbian™, Palm Pre™ and W3C™ Widgets mobile device platforms, the compile server module 314 may combine the HTML/Javascript source application 116 with each of an Android™ framework source code, a Nokia™ framework source code, a Symbian™ framework source code, a Palm Pre™ framework source code, and a W3C™ Widgets framework source code, all of which may be stored in the storage repository 32 connected to Linux™ compile server 24, prior to compiling by the Linux™ compile server 24.

In an optional embodiment, processing operation 516 may additionally comprise combining the HTML/Javascript source application 116 with one or more optional source code files in addition to the framework source code 316, which may be implemented by compile server module 314. Such optional source code files may be specified in the configuration file 118 associated with the HTML/Javascript source application 116. Optional source code files may comprise source code to add one or more of the following exemplary optional features to the HTML/Javascript source application 116: advertising features such as ad-ware for displaying advertising and/or links to advertising in a mobile device application, analytical features such as tracking and reporting user patterns and statistics for a mobile device application, validation features such as validating the HTML/Javascript source application 116 prior to or during compiling, optimization features such as optimizing the HTML/Javascript source application 116 to optimize compilation and/or execution of a mobile device application, and obfuscation features such as obfuscating and/or minifying HTML/Javascript source application 116 to reduce likelihood of reverse-compilation and further optimize execution of a mobile device application, for example. In such optional embodiment, the combination of such optional source code files with the HTML/Javascript source application 116 may be performed either before or after the mobile device-specific framework source code 316 is combined with the HTML/Javascript source application 116 according to processing operation 516.

In the next processing operation 518 of FIG. 5, the combined HTML/Javascript source application 116 and framework source code 316 are compiled to output executable native applications for each mobile device platform. Processing operation 518 may be implemented using the platform compile module 318 on each of compile servers 22, 24, 26, which may compile the combined HTML/Javascript source application 116 and framework source code 316 specific to each desired mobile device platform, according to a particular compilation process suited to or required for each desired mobile device platform. In an embodiment where compile server A 22 is an Apple xServe™ compile server for compiling applications for the iPhone™ mobile device platform, the platform compile module 318 on compile server 22 may compile the combined HTML/Javascript source application 116 and iPhone™ framework source code 316 by executing an xcodebuild command (such as through a /usr/bin/xcodebuild command line interface) on compile server 22 to output at least one object file comprising an executable native iPhone™ mobile device application, suitable for native execution on an iPhone™ mobile device.

In an embodiment where compile server B 24 is a Linux™ compile server 24 for compiling applications for the Android™ mobile device platform, the platform compile module 318 on compile server 24 may compile the combined HTML/Javascript source application 116 and Android™ framework source code 316 by executing the ANT command (such as by executing the ANT command from a command line within the file directory containing the combined source application 116 and Android™ framework source code 316) on compile server 24 to output at least one binary .apk file comprising an executable native Android™ mobile device application, suitable for native execution on an Android™ mobile device.

In an embodiment where compile server B 24 is a Linux™ compile server 24 for compiling applications for the Nokia™ and Symbian™ mobile device platforms, the platform compile module 318 on compile server 24 may compile the combined HTML/Javascript source application 116 and Nokia™ and/or Symbian™ framework source code 316 by generating a p-list information file and executing a .zip compression packaging process (such as through a command line interface) on compile server 24 to output at least one compressed .wgz file comprising an executable native Symbian™ mobile device application, suitable for native execution on a Nokia™ and/or other Symbian™ mobile device.

In an embodiment where compile server B 24 is a Linux™ compile server 24 for compiling applications for the Palm Pre™ mobile device platform, the platform compile module 318 on compile server 24 may compile the combined HTML/Javascript source application 116 and Palm Pre™ framework source code 316 by executing the palm-package command (such as by using a command line interface) on compile server 24 to output at least one .ipk file comprising an executable native Palm Pre™ mobile device application, suitable for native execution on a Palm Pre™ mobile device.

In an embodiment where compile server B 24 is a Linux™ compile server 24 for compiling applications for the W3C™ Widgets mobile device platform, the platform compile module 318 on compile server 24 may compile the combined HTML/Javascript source application 116 and W3C™ Widgets framework source code 316 by generating a p-list information file and executing a .zip compression packaging process (such as through a command line interface) on compile server 24 to output at least one compressed .wgt file comprising an executable native W3C™ Widgets mobile device application, suitable for native execution on a W3C™ Widgets compliant mobile device.

In an embodiment where compile server C 26 is a Windows™ compile server 26 for compiling applications for the Windows Mobile™ mobile device platform, the platform compile module 318 on compile server 26 may compile the combined HTML/Javascript source application 116 and Windows Mobile™ framework source code 316 by executing the devenv.exe command (such as through a command line interface) on compile server 26 to output at least one binary .exe and/or .cab file comprising an executable native Windows Mobile™ mobile device application, suitable for native execution on a Windows Mobile™ mobile device.

In an embodiment where compile server C 26 is a Windows™ compile server 26 for compiling applications for the Blackberry™ mobile device platform, the platform compile module 318 on compile server 26 may compile the combined HTML/Javascript source application 116 and Blackberry™ framework source code 316 by executing the rapc.exe command (such as through a command line interface from within the Blackberry SDK) on compile server 26 to output at least one binary .cod file comprising an executable native Blackberry™ mobile device application, suitable for native execution on a Blackberry™ mobile device.

In the last processing operation 520 of FIG. 5, the executable native applications are transmitted to user computer 10. Processing operation 520 may be implemented using compile server module 314 on compile servers 22, 24, 26, and typically also executable application server module 216 on build server 20. Following the completion of compile operation 518, the compile server module 314 on compile servers 22, 24, 26 may transmit the output executable native applications for each mobile device platform to be received by the build server 20, such as over a data connection between compile servers 22, 24, 26 and build server 20, according to known methods. Accordingly, following receipt of the executable native applications by build server 20, executable application server module 216 on build server 20 may transmit the executable native mobile device applications to user computer 10, such as over computer network 50, for example, according to known methods. Following receipt of the executable native applications for each particular mobile device platform by the user computer 10, each native application may be distributed or otherwise loaded on a mobile device corresponding to each of the mobile device platform-specific executable applications, for native execution on the mobile device by a mobile device user, for example.

In an alternative embodiment, executable application server module 216 on build server 20 may transmit the executable native mobile device applications to one or more provisioning servers 30 for distribution to mobile device users. In a particular examplary such embodiment, executable application server module 216 may transmit each mobile-device platform-specific executable native application to a provisioning server 30 corresponding to that mobile device platform—e.g. an iPhone™ native application may be transmitted to an Apple iTunes App Store™ provisioning server, whereas an Android™ native application may be transmitted to an Android Marketplace™ provisioning server, for example. In a further embodiment, executable application server module 216 may transmit the multiple platform-specific executable mobile device applications to either a user computer 10 or to one or more provisioning servers 30 by means of providing a static uniform resource locator (URL) referencing each mobile device application, such that the multiple mobile device applications may be retrieved from the build server 20 such as over network 50, according to known methods. Such static URL links provided by build server 20 may preferably also be predictable, such as by use of a common URL structure associated with each user computer 10 for providing the multiple mobile device applications, for example.

In an embodiment where the multiple executable mobile device applications are transmitted from the build server 20 to the user computer 10, the applications may be received by the user computer using SDK module 114, such that the executable mobile device applications are accessible from within the SDK tool running on the user computer. For example, where the user computer is running an SDK comprising a plugin for an IDE, the executable mobile device applications may be received within the IDE on the user computer, and where the user computer SDK comprises a mobile device emulator program for example, the executable mobile device applications may be received within the emulator program.

In an optional embodiment of the invention, the processing operations of FIG. 5 may additionally comprise the monitoring of the status of the compiling of multiple mobile device platform-specific applications. Such monitoring operation may be implemented using optional status module 218 on build server 20, for example. In such optional embodiment, upon receiving the HTML/Javascript source application 116 and configuration file 118 in operation 512, the build server 20 may transmit a status message to the user computer 10 providing the status of the compiling process comprised in operations 514, 516 and 518. As operations 514, 516 and 518 are completed by build server 20 and compile servers 22, 24, 25, the optional status module 218 on build server 20 may continue to send updated status messages to the user computer 10 regarding the status of the compiling process, until the completion of compiling resulting in the output of multiple executable native mobile device applications has been completed in operation 518. In such an embodiment, status module 218 may also further transmit a completion status message to the user computer 10 following the completion of operation 518 to provide one or more URLs whereby the executable native mobile device applications may be accessed by the user computer, for transmission of the executable native mobile device applications from the build server 20 to the user computer 10, as part of operation 520.

Figure 6:
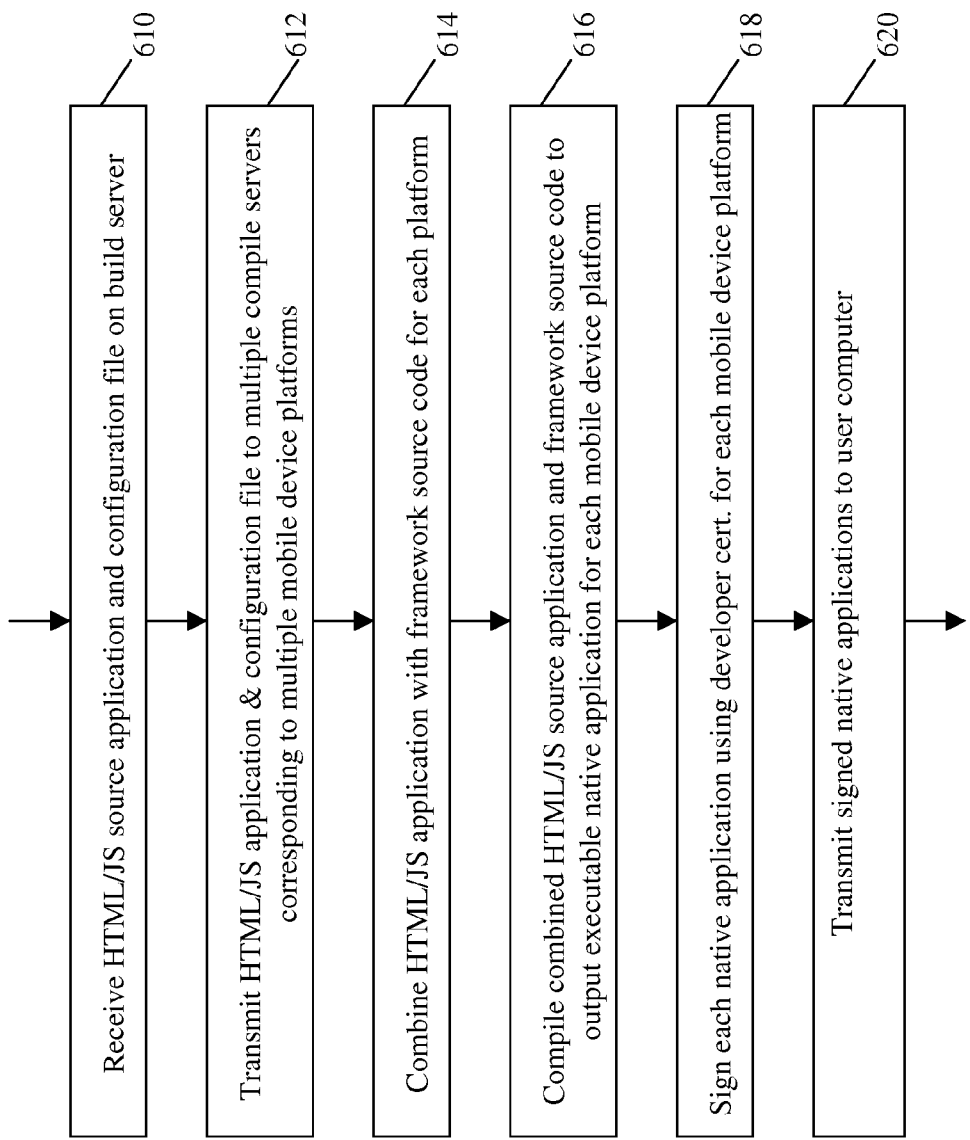
FIG. 6 illustrates a series of processing operations implemented by a build server and a compile server associated with an embodiment of the invention.

FIG. 6 illustrates a series of processing operations that may be implemented by system illustrated in FIG. 1, and the exemplary computers illustrated in FIGS. 2-4, according to an embodiment of the invention directed to compiling authenticated mobile device applications for multiple mobile device platforms. In the first processing operation 610 of FIG. 6, an HTML/Javascript source application 116 and configuration file 118 are received on build server 20, substantially similar to as described above with respect to processing operation 512 of FIG. 5. Similarly, processing operation 610 may be implemented using build server module 214 on build server 20 to receive HTML/Javascript source application 116 and an associated configuration file 118 from user computer 10, such as over computer network 50 according to known methods. As described in further detail above in connection with FIG. 5, SDK module 114 on user computer 10 may be used to transmit the HTML/Javascript source application 116 and configuration file 118 to build server 20. HTML/Javascript source application 116 may comprise any suitable software application intended to be run on multiple mobile device platforms, and expressed as a web application using HTML/Javascript.

In the second processing operation 612 of FIG. 6, the HTML/Javascript source application 116 and configuration file 118 are transmitted to multiple compile servers 22, 24, 26 corresponding to multiple mobile device platforms, substantially similar to as described above with respect to processing operation 514 of FIG. 5. Similarly, processing operation 612 may be implemented using user build server module 214 on build server 20, which transmits the HTML/Javascript source application 116 and configuration file 118 to multiple compile servers 22, 24, 26 by means of data connections to compile servers 22, 24, 26, such as direct data connections, or alternatively by connection over a computer network, such as network 50, according to known methods. In such embodiment, configuration file 118 comprises at least one developer authentication certificate, suitable for use to authenticate and verify the identity of the developer of the HTML/Javascript source application 116 in the process of compiling the source application 116, as may be required by many mobile device platforms in order to facilitate installation of native mobile device applications on particular mobile devices, or to allow distribution of native mobile device applications through device platform-specific provisioning services, such as the Apple iTunes App Store™ and Blackberry AppWorld™ for example.

In the next processing operation 614 of FIG. 6, the HTML/Javascript source application 116 is combined with framework source code 316 for each mobile device platform, substantially similar to as described above in reference to processing operation 516 of FIG. 5. Similarly, processing operation 614 may be implemented using compile server module 314 running on each of compile servers 22, 24, 26, for each of the multiple mobile device platforms to which the HTML/Javascript source application 116 is to be compiled, to result in a combined HTML/Javascript application including the framework source code 316. As described above in reference to FIG. 5, a framework source code file 316 is defined for each of the mobile device platforms desired for compilation, to enable an HTML/Javascript application programming interface (API) to expose native functions and/or features for each of the corresponding mobile device platforms.

In the next processing operation 616 of FIG. 6, the combined HTML/Javascript source application 116 and framework source code 316 are compiled to output executable native applications for each mobile device platform, substantially similar to as described above with reference to operation 518 of FIG. 6. Similarly, processing operation 616 may be implemented using the platform compile module 318 on each of compile servers 22, 24, 26, which may compile the combined HTML/Javascript source application 116 and framework source code 316 specific to each desired mobile device platform, according to a particular compilation process suited to or required for each desired mobile device platform, as described above with specific examples of compile process steps for particular mobile device platforms.

In the next processing operation 618 of FIG. 6, each native application is signed using a developer certificate for each mobile device platform. Processing operation 618 may be implemented using platform compile module 318 on each of compile servers 22, 24, 26, for each mobile device platform which requires signing of the compiled executable native mobile device application, and for which a developer authentication certificate is included and/or referenced in the configuration file 118 received from the user computer 10. For example, where compile server 22 is an Apple xServe™ compile server for compiling iPhone™ applications, the platform compile module 318 on compile server 22 may be used to digitally sign the iPhone™ executable native application compiled in operation 616 using the developer iPhone™ certificate referenced in configuration file 118, to verify the identity of the developer of the application, such as is required for submission of an executable native iPhone™ application to the Apple iTunes App Store™ for installation on iPhone™ mobile devices, for example.

In the last processing operation 620 of FIG. 6, the signed executable native applications are transmitted to user computer 10, substantially similar to as described above in reference to operation 520 in FIG. 5. Similarly, processing operation 620 may be implemented using compile server module 314 on compile servers 22, 24, 26, and typically also executable application server module 216 on build server 20. Following the completion of signing operation 618, the compile server module 314 on compile servers 22, 24, 26 may transmit the output executable native applications for each mobile device platform to be received by the build server 20, such as over a data connection between compile servers 22, 24, 26 and build server 20, according to known methods. Accordingly, following receipt of the executable native applications by build server 20, executable application server module 216 on build server 20 may transmit the executable native mobile device applications to user computer 10, such as over computer network 50, for example, according to known methods. Following receipt of the executable native applications for each particular mobile device platform by the user computer 10, each native application may be distributed or otherwise loaded on a mobile device corresponding to each of the mobile device platform-specific executable applications, for native execution on the mobile device by a mobile device user, for example.

An embodiment of the present invention relates to a computer storage product with a computer-readable medium having computer code thereon for performing various computer-implemented operations. The computer-readable media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices including Flash RAM memory storage cards, sticks and chips, for example. Examples of computer code include machine code, such as produced by a compiler, and files containing higher-level code that are executed by a computer using an interpreter. For example, an embodiment of the invention may be implemented using HTML, XML, JavaScript, Java, C#, C++, Objective C, or other scripting, markup and/or programming languages and development tools. Another embodiment of the invention may be implemented in hardwired circuitry in place of, or in combination with, machine-executable software instructions.

The exemplary embodiments herein described are not intended to be exhaustive or to limit the scope of the invention to the precise forms disclosed. They are chosen and described to explain the principles of the invention and its application and practical use to allow others skilled in the art to comprehend its teachings.

As will be apparent to those skilled in the art in light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A non-transitory computer readable medium, comprising executable instructions to:
provide, from a build server, an SDK to a client computer, the SDK comprising executable instructions for communicating with the build server;
receive, at the build server from the client computer over a computer network, a source application and a configuration file referencing one or more files of the source application, wherein the source application comprises source code;
transmit, from the build server, the source application and the configuration file to multiple separate compile servers, wherein each separate compile server corresponds with a specific mobile device platform;
at each compile server of the multiple separate compile servers:
combine the source application with a mobile device platform specific framework source code for the specific mobile device platform with which the compile server corresponds;
compile the source application and the framework source code to output an executable native application for the specific mobile device platform with which the compile server corresponds; and
transmit, from each of the compile servers, to the client computer, over a computer network, each of the respective executable native applications.

2. The non-transitory computer readable medium according to claim 1, additionally comprising instructions to monitor at least one compiling progress measure during compilation on at least one compile server and to transmit at least one status message from the compile server to the client computer.

3. The non-transitory computer readable medium according to claim 1, additionally comprising instructions to transmit one or more URL to the client computer indicating a location where at least one the executable native application may be accessed.

4. The non-transitory computer readable medium according to claim 1, additionally comprising instructions to receive at least one the executable native application using the SDK on the client computer.

5. The non-transitory computer readable medium according to claim 1, additionally comprising instructions to provide at least one executable native application from the client computer to at least one provisioning server.

6. The non-transitory computer readable medium according to claim 1, additionally comprising instructions to combine the source application with one or more source code files for providing at least one of advertising, analytical, validation, optimization and obfuscation features.

7. A computer implemented method of automated remote compiling of native applications for multiple mobile device platforms, the computer implemented method comprising:
providing, from a build server, an SDK to a client computer, the SDK comprising computer executable instructions for communicating with the build server over a computer network;
receiving, at the build server, a source application and a configuration file, wherein the source application comprises source code;
referencing one or more files of the source application over a computer network from a client computer to the build server;

transmitting the source application and the configuration file from the build server to multiple separate compile servers, wherein each separate compile server corresponds with a specific mobile device platform;

at each compile server of the multiple separate compile servers:

combining the source application with a mobile device platform specific framework source code for the specific mobile device platform with which the compile server corresponds;

compiling the source application and the framework source code to output an executable native application for the specific mobile device platform with which the compile server corresponds; and transmitting, from each of the compile servers, to the client computer, over a computer network, each respective executable native application.

8. The computer implemented method according to claim 7, additionally comprising monitoring at least one compiling progress measure during compilation on at least one compile server and transmitting at least one status message from the compile server to the client computer.

9. The computer implemented method according to claim 7, additionally comprising transmitting one or more URL to the client computer indicating a location where at least one the executable native application may be accessed.

10. The computer implemented method according to claim 7, additionally comprising receiving at least one executable native application using the SDK on the client computer.

11. The computer implemented method according to claim 7, additionally comprising providing at least one executable native application from the client computer to at least one provisioning server.

12. The computer implemented method according to claim 7, additionally comprising combining the source application with one or more source code files for providing at least one of advertising, analytical, validation, optimization and obfuscation features.

13. A non-transitory computer readable medium, comprising executable instructions to:

receive a source application comprising source code and a configuration file comprising developer certificates corresponding to multiple mobile device platforms over a computer network from a client computer to a build server;

transmit the source application and the configuration file to multiple compile servers, wherein each separate compile server corresponds with a specific mobile device platform;

at each compile server of the multiple separate compile servers:

combine the source application with a mobile device platform specific framework source code the specific mobile device platform with which the compile server corresponds;

compile the source application and the framework source code to output an executable native application for the specific mobile device platform with which the compile server corresponds;

sign the executable native application using the developer certificate corresponding to each executable native application to output a signed native application for the specific mobile device platform with which the compile server corresponds; and transmit, from each of the compile servers, to the client computer, over a computer network, each respective signed native application.

14. The non-transitory computer readable medium according to claim 13, additionally comprising instructions to monitor at least one compiling progress measure during compilation on at least one compile server and to transmit at least one status message from the compile server to the client computer.

15. The non-transitory computer readable medium according to claim 13, additionally comprising instructions to provide at least one executable native application from the client computer to at least one provisioning server.

16. The non-transitory computer readable medium according to claim 13, wherein the developer certificate authenticates and verifies the identity of one or more developers of the source application.

17. A computer implemented method of automated remote compiling of native applications for multiple mobile device platforms, the computer implemented method comprising:

receiving at a build server from the client computer over a computer network, a source application comprising source code and a configuration file comprising developer certificates corresponding to multiple mobile device platforms;

transmitting the source application and the configuration file from the build server to multiple compile servers, wherein each separate compile server corresponds with a specific mobile device platform;

at each compile server of the multiple separate compile servers:

combining the source application with a mobile device platform specific framework source code for the specific mobile device platform with which the compile server corresponds;

compiling the source application and the framework source code on the compile server to output an executable native application for the specific mobile device platform with which the compile server corresponds;

signing the executable native application using the developer certificate corresponding to the executable native application to output a signed native application for the mobile device platform; and transmitting, from each of the compile servers, to the client computer, over a computer network, each respective signed native application.

18. The computer implemented method according to claim 17, additionally comprising monitoring at least one compiling progress measure during compilation on at least one compile server and transmitting at least one status message from the compile server to the client computer.

19. The computer implemented method according to claim 17, additionally comprising providing at least one the executable native application from the client computer to at least one provisioning server.

20. The computer implemented method according to claim 17, wherein the developer certificate authenticates and verifies the identity of one or more developers of the source application.

21. The non-transitory computer readable medium according to claim 1, wherein the source application includes at least one of HTML source code and Javascript source code.

* * * * *